US010387499B2

(12) United States Patent
Kuroyama et al.

(10) Patent No.: US 10,387,499 B2
(45) Date of Patent: Aug. 20, 2019

(54) COOKING RECIPE SUPPLY METHOD AND CONTROL PROGRAM

(71) Applicant: Panasonic Intellectual Property Management Co., Ltd., Osaka (JP)

(72) Inventors: Kazuhiro Kuroyama, Osaka (JP); Toshiko Mineno, Nara (JP); Gantetsu Matsui, Kyoto (JP); Mahbub Rashid, Osaka (JP); Shinsuke Kawaguchi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 193 days.

(21) Appl. No.: 15/309,506

(22) PCT Filed: May 20, 2015

(86) PCT No.: PCT/JP2015/002523
§ 371 (c)(1),
(2) Date: Nov. 8, 2016

(87) PCT Pub. No.: WO2015/182067
PCT Pub. Date: Dec. 3, 2015

(65) Prior Publication Data
US 2017/0161290 A1 Jun. 8, 2017

(30) Foreign Application Priority Data
May 29, 2014 (JP) .................. 2014-110902

(51) Int. Cl.
*G06F 16/9032* (2019.01)
*G06F 16/903* (2019.01)
(Continued)

(52) U.S. Cl.
CPC .. *G06F 16/90324* (2019.01); *G06F 16/90335* (2019.01); *G06Q 10/00* (2013.01);
(Continued)

(58) Field of Classification Search
CPC .......... G06F 17/3097; G06F 17/30979; G06F 16/90324; G06F 16/90335; G06Q 10/00; G06Q 30/02; G06Q 10/063; G06Q 10/087
See application file for complete search history.

(56) References Cited

U.S. PATENT DOCUMENTS 8,820,624 B2 * 9/2014 Park ..................... G06Q 50/00
235/375
9,690,462 B2 * 6/2017 Kouda ..................... F24C 7/08
(Continued)

FOREIGN PATENT DOCUMENTS

EP          2821707 A1      1/2015
JP         2004-126858      4/2004
(Continued)

OTHER PUBLICATIONS

The Extended European Search Report dated Feb. 24, 2017 for the related European Patent Application No. 157998303.
(Continued)

*Primary Examiner* — Jay A Morrison
(74) *Attorney, Agent, or Firm* — McDermott Will & Emery LLP

(57) ABSTRACT

A cooking recipe supply method includes a first acquiring step of acquiring identification information for identifying a cooking appliance and type information representing a type of the cooking appliance, and a second acquiring step of acquiring cooking recipe information related to the identification information. When the cooking recipe information includes the cooking recipe information related to the identification information, the cooking recipe information related to the identification information is supplied. Further, the method includes a supply step of, when the cooking recipe information related to the identification information is not present, supplying the cooking recipe information based
(Continued)

on the type information. As a result, the user can easily view a suitable cooking recipe according to the cooking appliance owned by the user.

4 Claims, 11 Drawing Sheets

(51) Int. Cl.
*G06Q 10/00* (2012.01)
*G06Q 10/06* (2012.01)
*G06Q 10/08* (2012.01)
*G06Q 30/02* (2012.01)

(52) U.S. Cl.
CPC ......... *G06Q 10/063* (2013.01); *G06Q 10/087* (2013.01); *G06Q 30/02* (2013.01)

(56) References Cited

U.S. PATENT DOCUMENTS

| | | | |
|---|---|---|---|
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2007/0293961 A1 | 12/2007 | Ikuzawa et al. | |
| 2014/0278936 A1* | 9/2014 | Fescenmeyer | H05B 1/0261 705/14.45 |
| 2015/0019987 A1 | 1/2015 | Kouda et al. | |

FOREIGN PATENT DOCUMENTS

| | | | |
|---|---|---|---|
| JP | 2007-220081 | 8/2007 | |
| JP | 2013-213663 | 10/2013 | |
| JP | 5304964 B | 10/2013 | |
| WO | 2013/128532 A1 | 9/2013 | |
| WO | WO-2013128532 A1 * | 9/2013 | ............... F24C 7/08 |

OTHER PUBLICATIONS

International Search Report of PCT application No. PCT/JP2015/002523 dated Jul. 28, 2015.

* cited by examiner

| COOKING RECIPE ID INFORMATION | TITLE INFORMATION | COOKING PROCEDURE INFORMATION | CONTROL INFORMATION | IDENTIFICATION INFORMATION | TYPE INFORMATION |
|---|---|---|---|---|---|
| X001 | P001 | Q001 | R001 | A-01 | A |
| X002 | P001 | Q002 | - | B-01 | B |
| X003 | P003 | Q003 | R003 | A-01 | A |
| X004 | P001 | Q004 | R004 | A-02 | A |
| X005 | P005 | Q005 | - | B-01 | B |
| X006 | P006 | Q006 | R006 | A-02 | A |
| X006 | P006 | Q006 | R007 | A-02a | A |
| X007 | P007 | Q007 | - | B-01 | B |
| X008 | P008 | Q008 | - | B-02 | B |
| X009 | P007 | Q009 | R009 | A-01 | A |

FIG. 11

| COOKING RECIPE ID INFORMATION | TITLE INFORMATION | COOKING PROCEDURE INFORMATION | CONTROL INFORMATION | IDENTIFICATION INFORMATION | COOKING FUNCTION INFORMATION |
|---|---|---|---|---|---|
| X001 | P001 | Q001 | R001 | A-01 | M |
| X002 | P001 | Q002 | - | B-01 | S |
| X003 | P003 | Q003 | R003 | A-01 | S |
| X004 | P001 | Q004 | R004 | A-02 | G |
| X005 | P005 | Q005 | - | B-01 | G |
| X006 | P006 | Q006 | R006 | A-02 | M |
| X006 | P006 | Q006 | R007 | A-02a | M |
| X007 | P007 | Q007 | - | B-01 | G |
| X008 | P008 | Q008 | - | B-02 | G |
| X009 | P009 | Q009 | R009 | A-01 | M |
| X010 | P009 | Q010 | R010 | A-02 | G |

| IDENTIFICATION INFORMATION | TYPE INFORMATION | COOKING FUNCTION INFORMATION | RELEASE TIME INFORMATION |
|---|---|---|---|
| A-01 | A | M,S | MAY 2013 |
| A-02 | A | G,M,S | MAY 2014 |
| A-02a | A | M,S | JUNE 2014 |
| B-01 | B | G | SEPTEMBER 2012 |
| B-02 | B | G | SEPTEMBER 2013 |

700

COOKING RECIPE SUPPLY METHOD AND CONTROL PROGRAM

THIS APPLICATION IS A U.S. NATIONAL PHASE APPLICATION OF PCT INTERNATIONAL APPLICATION PCT/JP2015/002523.

TECHNICAL FIELD

The present invention relates to a cooking recipe supply method and a control program using an information terminal that receives a cooking recipe supplied by a server or an information terminal that transmits a cooking program to a cooking appliance.

BACKGROUND ART

Conventionally, a cooking recipe supply method for transmitting a cooking program to a cooking appliance via an information terminal has been proposed (for example, see Patent Literature 1). Patent Literature 1 discloses that a cooking recipe related to a cooking program and a cooking recipe that is not related to a cooking program are supplied to a cooking appliance via an information terminal. As a result, while user's visibility is being heightened, usability is improved.

Normally, as to a cooking recipe to be developed for a cooking appliance, an optimum cooking method is varied for each product number of each cooking appliance. That is to say, even cooking recipes for the same type of cooking electric appliances (for example, microwave ovens) or cooking recipes having the same title (for example, the names of the cooking recipes) have different procedures and setting methods although contents of these recipes are similar.

In this case, when a plurality of cooking recipes is searched by a title or a food material, a plurality of cooking recipes with the same titles is extracted. For this reason, a cooking recipe that is optimum for a cooking appliance owned by a user should be selected from a plurality of the extracted searched results.

Further, a recipe that is optimum for a cooking appliance owned by a user is not included in a plurality of the searched results. In this case, while checking contents that can be used as a reference of cooking, the user should select a cooking recipe from the cooking recipes having the similar contents.

CITATION LIST

Patent Literature

PTL 1: Japanese Patent No. 5,304,964

SUMMARY OF THE INVENTION

A cooking recipe supply method of the present invention includes a first acquiring step of acquiring identification information for identifying a cooking appliance and type information representing a type of the cooking appliance, and a second acquiring step of acquiring cooking recipe information related to the identification information. When the cooking recipe information includes the recipe information related to the identification information, the cooking recipe information related to the identification information is supplied. Further, the method includes a supply step of, when the cooking recipe information does not include the cooking recipe information related to the identification information, supplying the cooking recipe information based on the type information.

According to this method, even when cooking recipe information viewed by a user includes a plurality of cooking recipes with the same title, cooking recipe information of a cooking appliance owned by the user (namely, the cooking recipe information related to the identification information) can be supplied. Further, even when cooking recipe information related to the identification information is not present, the cooking recipe information can be supplied based on type information of the cooking appliance owned by the user. As a result, the user can easily view a suitable cooking recipe as a reference according to the user's cooking appliance. This results in improvement of usability and convenience when the user views cooking recipes.

Further, a control program that supplies a cooking recipe of the present invention includes a step of acquiring identification information for identifying a cooking appliance and type information representing a type of the cooking appliance, and a step of acquiring plural pieces of cooking recipe information including cooking recipe information related to the identification information. When the cooking recipe information includes the cooking recipe information related to the identification information, the cooking recipe information related to the acquired identification information is supplied. Further, when the cooking recipe information does not include cooking recipe information related to the identification information, a computer is made to execute a step of supplying the cooking recipe information based on the type information.

According to this control program, even when a plurality of cooking recipes having the same title is present in the cooking recipes to be viewed by a user, the cooking recipe information about the cooking appliance owned by the user (namely, the cooking recipe information related to the identification information) can be supplied. Further, even when the cooking recipe information related to the identification information is not present, the cooking recipe information can be supplied based on the type information of the cooking appliance owned by the user. As a result, the user can easily view an optimum cooking recipe to be easily referred to.

BRIEF DESCRIPTION OF DRAWINGS

FIG. 11 is a diagram illustrating another example of information stored in the cooking recipe information database in the exemplary embodiment.

FIG. 12 is a diagram illustrating one example of related information stored in a related information database in the exemplary embodiment.

DESCRIPTION OF EMBODIMENT

Figure 1:
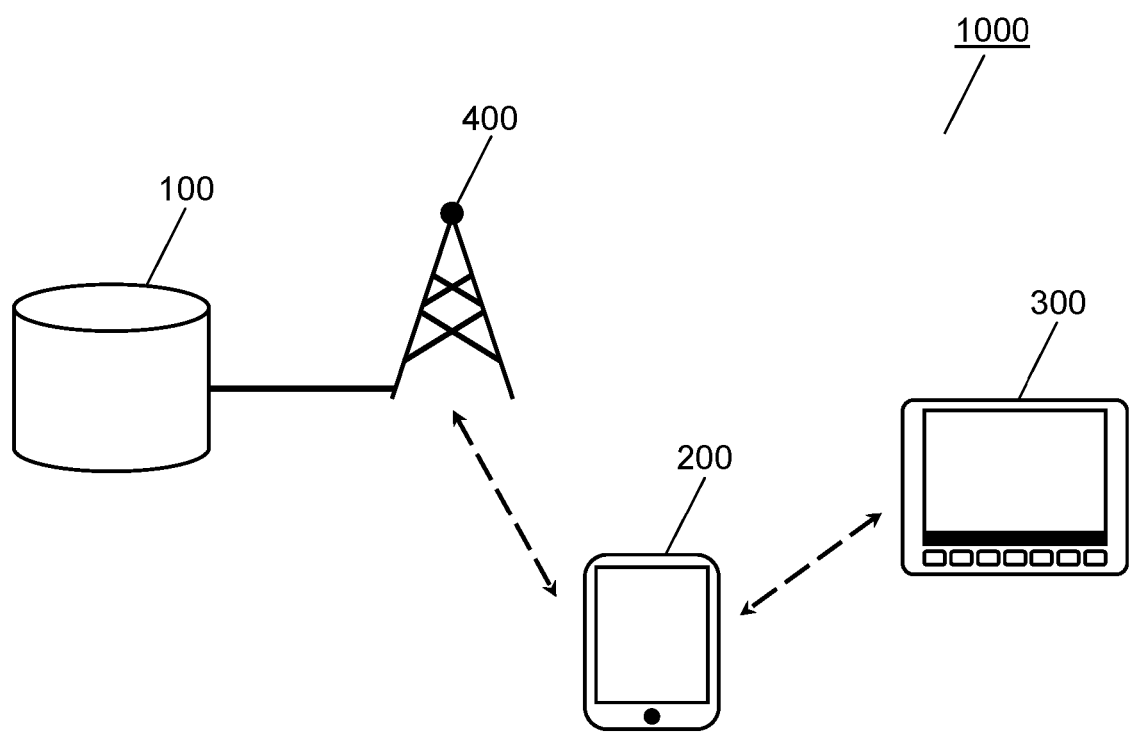
FIG. 1 is a diagram illustrating an entire configuration of a communication system according to an exemplary embodiment of the present invention.

An exemplary embodiment of the present invention will be described with reference to the drawings. Since components having the same reference symbols have the same configuration in the drawings, detailed description of these components will be omitted. Further, the exemplary embodiment does not limit the present invention.

Exemplary Embodiment

First, a communication system according to the exemplary embodiment of the present invention will be described with reference to FIG. 1.

FIG. 1 is a diagram illustrating an entire configuration of a communication system according to an exemplary embodiment of the present invention.

Communication system 1000 according to the exemplary embodiment includes at least server 100, information terminal 200, and cooking appliance 300. The exemplary embodiment illustrates a configuration where server 100 and information terminal 200 are communication-connected via base station 400 as an example, but the present invention is not limited to this. For example, server 100 and information terminal 200 may be connected via a network. Further, cooking appliance 300 according to the exemplary embodiment includes, for example, a microwave oven, a rice cooker, an IH (Induction Heating) cooking heater, a toaster, a stove, a grill, an oven, a food blender, and a coffee maker.

Server 100, information terminal 200, and cooking appliance 300 forming communication system 1000 according to the exemplary embodiment will be concretely described below with reference to FIG. 2.

Figure 2:
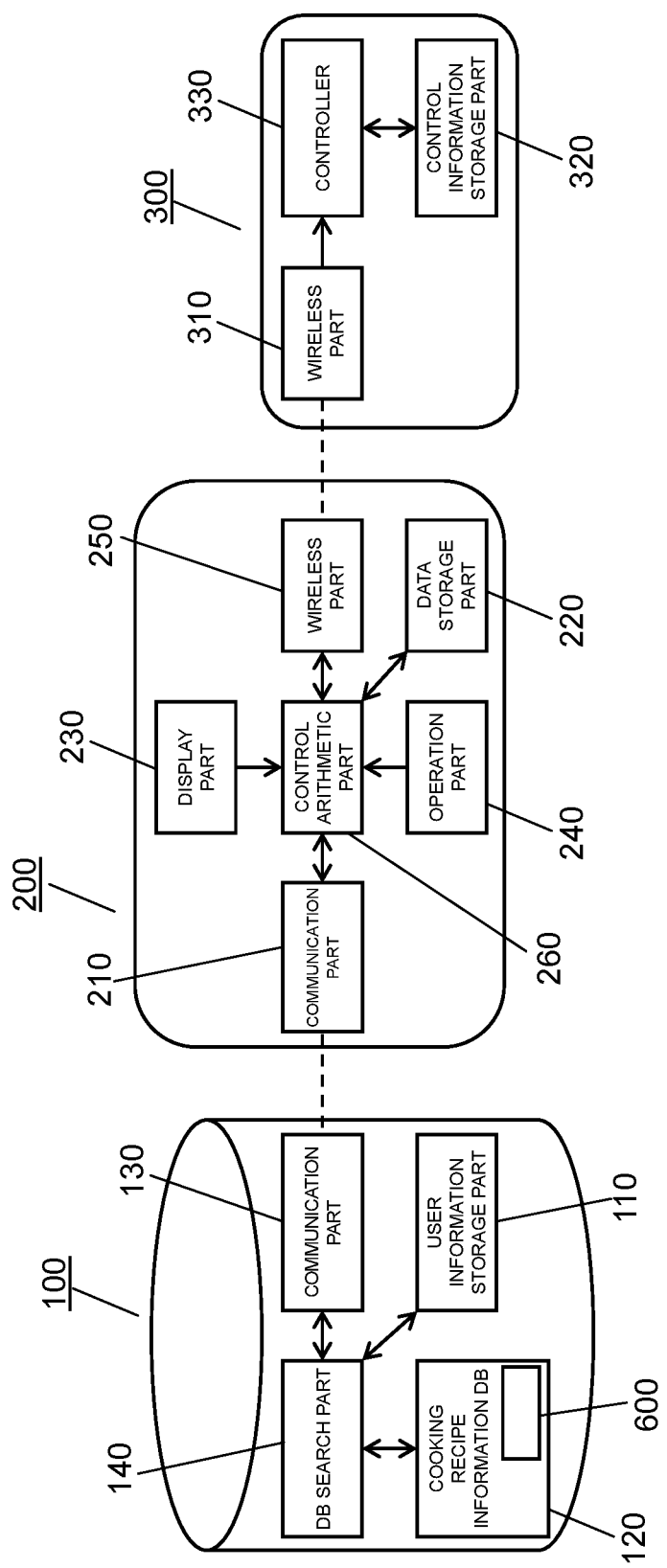
FIG. 2 is a block diagram illustrating a configuration of a server, an information terminal and a cooking appliance according to the exemplary embodiment.

FIG. 2 is a block diagram illustrating a configuration of a server, an information terminal and a cooking appliance according to the exemplary embodiment.

Server 100 that structures communication system 1000 has user information storage part 110, cooking recipe information database 120, communication part 130, and database search part 140. Communication part 130 communicates with communication part 210 of information terminal 200. For example, a communication network such as an internet or data communication is used as a communication method. User information storage part 110 stores user IDs for identifying users, identification information for identifying cooking appliances owned by users, and type information of the cooking appliances. Database search part 140 acquires identification information and type information of the cooking appliances owned by the user through an access to user information storage part 110. Cooking recipe information database 120 stores plural pieces of cooking recipe information 600 (a cooking recipe information group).

Figure 10:
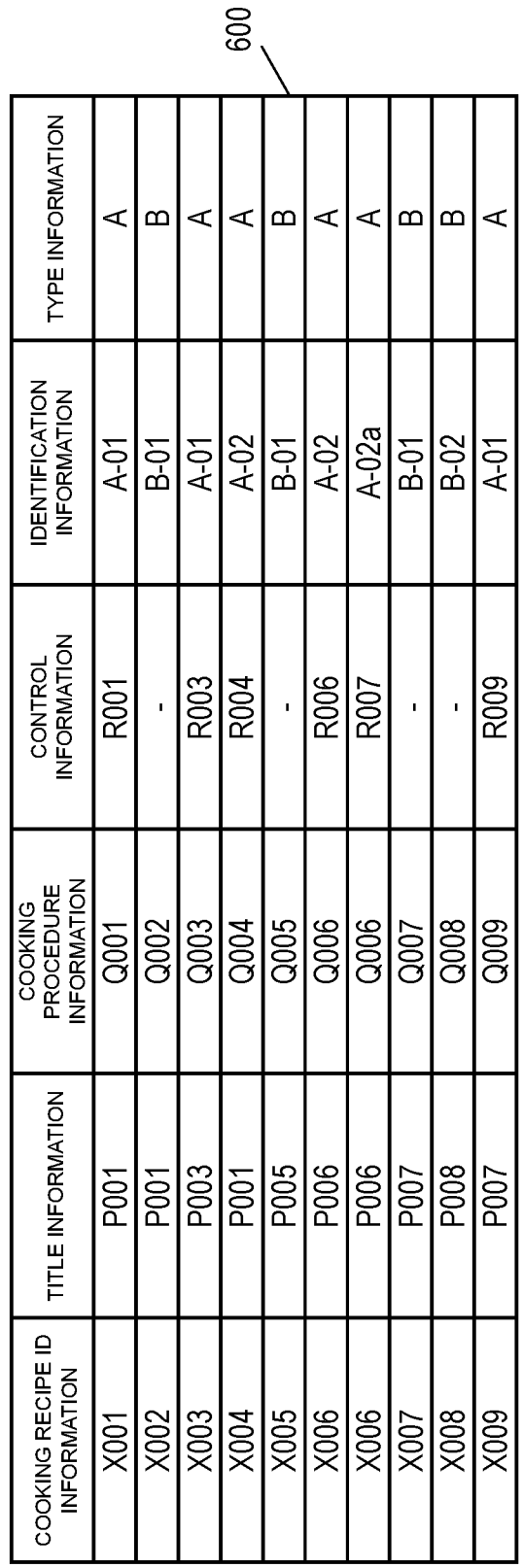
FIG. 10 is a diagram illustrating one example of information stored in a cooking recipe information database in the exemplary embodiment.

Concretely, as shown in FIG. 10, cooking recipe information 600 includes, for example, cooking recipe ID information, title information, cooking procedure information, control information (a control program), identification information, and type information. The cooking recipe ID information is information one-to-one related with cooking recipe information 600. That is to say, the cooking recipe ID information is used for specifying cooking recipe information 600 to be stored in cooking recipe information database 120. The title information is information representing a title to be given to cooking recipe information 600. Concretely, an example of the title information is a cooking name of cooking recipe information 600 (for example, curry and rice). The cooking procedure information is information representing a cooking procedure in detail, and is concretely a cooking recipe.

Further, the control information (the cooking program) is information for setting so that cooking appliance 300 optimally does cooking based on the cooking procedure information. Concretely, cooking appliance 300 is a microwave oven, and title information of a cooking recipe is "gratin". A case of heating for 6 minutes by 600 W when au gratin is cooked by using an oven function of the microwave oven is assumed in the following description. In this case, the control information is information representing contents of an operation for "heating for 6 minutes by 600 W", or setting information for setting the microwave oven to perform the heating operation under the above condition.

The identification information is information for identifying the cooking appliance 300, and for example, a model number or a part number. The type information is information for specifying a type for classifying the type of cooking appliance 300. For example, when the model number of the microwave oven is a cooking appliance with "A-01", the identification information is "A-01", and the type information is a "microwave oven". When only the type may be classified, for example, a first character of the type number "A" may be the type information.

Plural pieces of cooking recipe information 600 stored in cooking recipe information database 120 will be concretely described below with reference to FIG. 10.

FIG. 10 is a diagram illustrating one example of information stored in the cooking recipe information database in the exemplary embodiment.

As shown in FIG. 10, in cooking recipe information 600, cooking recipe ID information "X001", "X002", and "X004" has the title information "P001". That is to say, the cooking procedure information, the identification information, and control information in cooking recipe information 600 are different, but names of cooking (title information) of the cooking recipe information are identical to each other.

Further, two pieces of cooking recipe ID information "X006" are registered in cooking recipe information database 120 of cooking recipe information 600. This case shows an example where a minor change is made so that the model number of a cooking appliance as the identification information is varied. That is to say, each piece of the cooking recipe ID information "X006" has the same cooking procedure information but different control information.

Further, the control information related to the cooking recipe ID information "X002", "X005", "X007", and "X008" of cooking recipe information 600 indicates "-". This means that cooking recipe information 600 does not include control information.

Cooking recipe information 600 in cooking recipe information database 120 is structured and stored in the above manner.

Further, database search part 140 of server 100 searches plural pieces of cooking recipe information 600 stored in cooking recipe information database 120 for specific cooking recipe information 600 (a specific cooking recipe information group) that matches with a condition. A search condition is decided by an instruction or a keyword received from information terminal 200.

Information terminal 200 structuring communication system 1000 includes at least communication part 210, data storage part 220, display part 230, operation part 240, wireless part 250, and control arithmetic part 260. Communication part 210 communicates with communication part 130 of server 100. Data storage part 220 stores cooking recipes and control information received by communication part 210.

Operation part 240 is used by a user to input a condition of retrieval of a specific cooking recipe information group from database search part 140 of server 100. That is to say, the specific cooking recipe information group is retrieved by input of operation part 240 from cooking recipe information groups stored in database search part 140 of server 100.

Display part 230 is formed by, for example, a liquid crystal display, and displays cooking recipes stored in data storage part 220. Concretely, display part 230 displays a specified cooking recipe information group based on the condition input by the user through operation part 240.

Operation part 240 is used also when the user selects a specific cooking recipe when a list of a plurality of cooking recipes is displayed on display part 230. Further, operation part 240 is used also when buttons displayed on display part 230 are pressed. Further, this exemplary embodiment illustrates a configuration where operation part 240 is incorporated into display part 230 of information terminal 200 as a touch panel, but the present invention is not limited to this. For example, display part 230 and operation part 240 may be separately configured.

Wireless part 250 communicates with wireless part 310 of cooking appliance 300. Communication of wireless part 250 is realized by wireless communication technologies such as infrared communication, specified low power radio, NFC (Near Field Communication), a wireless tag or RFID (Radio Frequency Identification), Bluetooth (registered trademark), and Wi-Fi.

Control arithmetic part 260 controls communication part 210, data storage part 220, display part 230, operation part 240, and wireless part 250, and operates data that is exchanged between the respective components. Further, control arithmetic part 260 generates display screen data (for example, list screen 231 or cooking method screen 232) for screen display, described later, with reference to FIG. 5 to FIG. 8, and makes screen transition control for display part 230.

Cooking appliance 300 configuring communication system 1000 includes at least wireless part 310, control information storage part 320, and controller 330.

Wireless part 310 communicates with wireless part 250 of information terminal 200. The communication of wireless part 310 is realized by using a communication method corresponding to a communication method of wireless part 250 of information terminal 200.

Control information storage part 320 stores control information transmitted from server 100 when wireless part 310 receives the control information via information terminal 200.

Controller 330 makes an operation control based on the control information stored in control information storage part 320, and controls an operation part (not shown) of cooking appliance 300. When cooking appliance 300 is, for example, a microwave oven, the operation part is a transmitter that transmits a microwave. When cooking appliance 300 is a rice cooker, the operation part is a heater that heats rice.

The respective components of communication system 1000 according to the exemplary embodiment are configured in such a manner.

The operation of communication system 1000 according to the exemplary embodiment will be described below with reference to FIG. 3.

Figure 3:
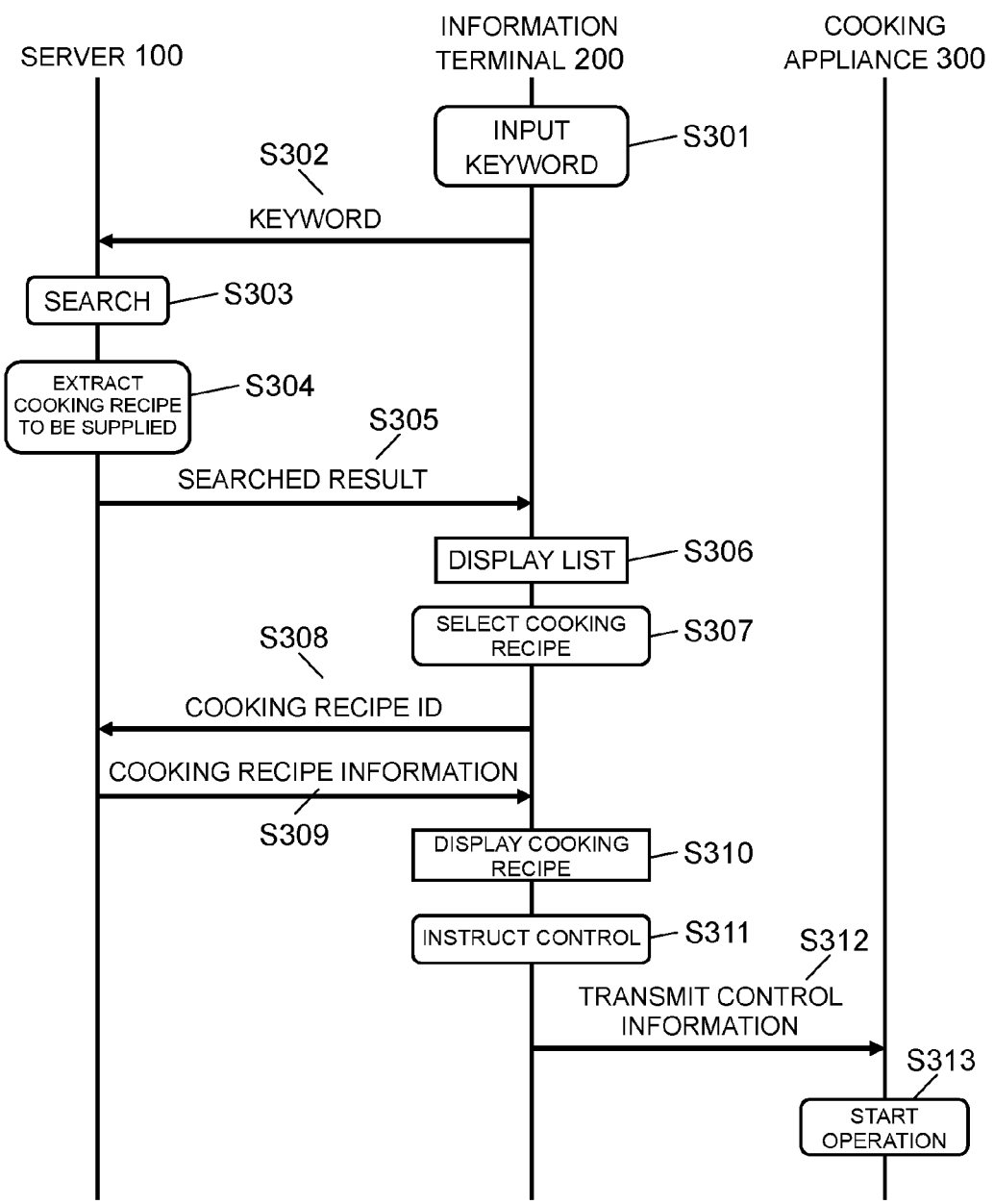
FIG. 3 is a diagram illustrating a communication sequence of the communication system in the exemplary embodiment.

FIG. 3 is a diagram illustrating a communication sequence of a communication system in the exemplary embodiment.

As shown in FIG. 3, the user inputs a keyword relating to a cooking recipe desired to be searched using operation part 240 of information terminal 200 (step S301).

The input keyword is transmitted to server 100 via communication part 210 (step S302).

Database search part 140 of server 100 that receives the keyword searches all cooking recipe information 600 (for example, title information and cooking procedure information) stored in cooking recipe information database 120. Concretely, cooking recipe information 600 that uses a word matching with the input keyword is retrieved from cooking recipe information 600 (corresponding to a second acquiring step) (step S303).

Database search part 140, then, extracts a cooking recipe to be supplied from plural pieces of cooking recipe information 600 that match with the keyword (step S304).

A detailed flow of the operation at step S304 for extracting the cooking recipe will be described with reference to FIG. 4.

Figure 4:
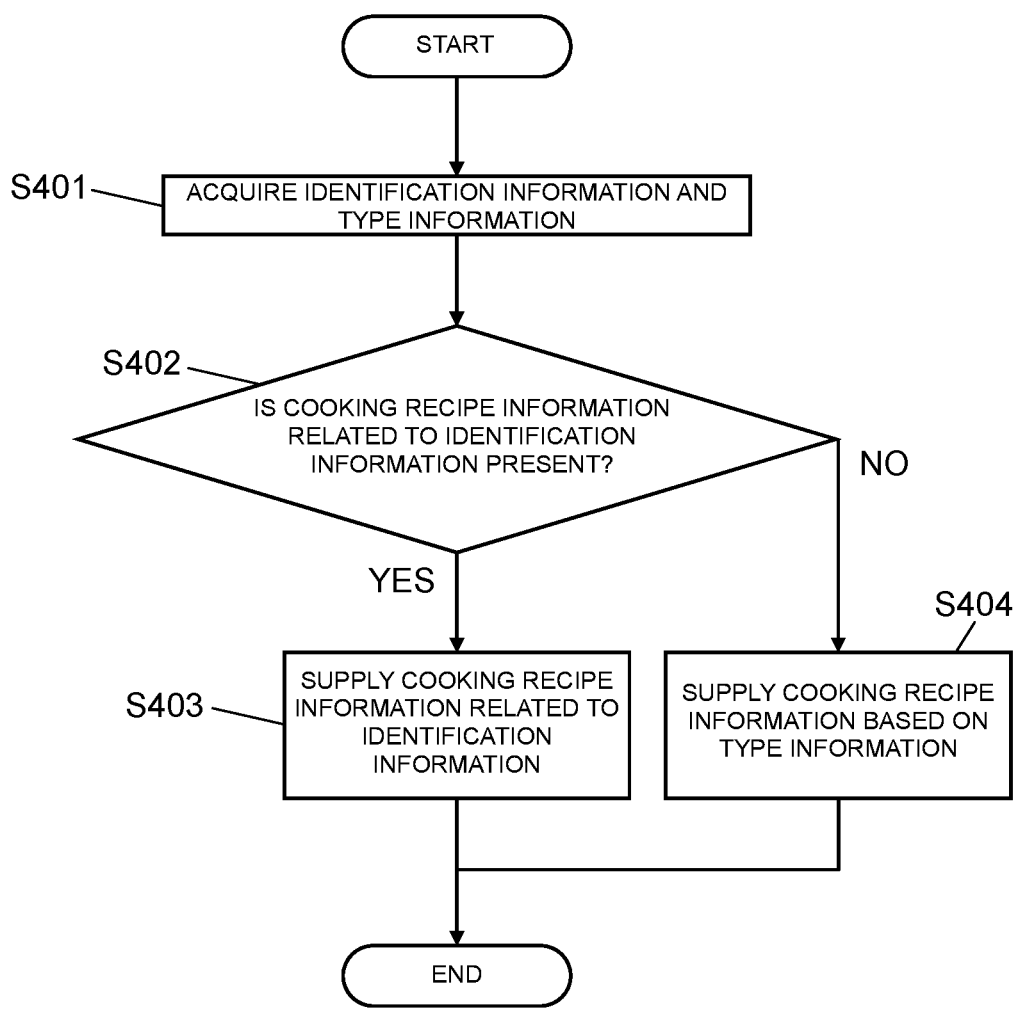
FIG. 4 is a flowchart illustrating a method for supplying a cooking recipe in the exemplary embodiment.

FIG. 4 is a flowchart illustrating a method for supplying a cooking recipe in the exemplary embodiment.

As shown in FIG. 4, database search part 140 of server 100 accesses to user information storage part 110. Identification information and type information of the cooking appliance owned by the user are acquired from user information storage part 110 (corresponding to a first acquiring step) (step S401).

Database search part 140 then, determines whether cooking recipe information 600 searched at step S303 shown in FIG. 3 includes cooking recipe information related to the identification information acquired at step S401 (step S402). When the cooking recipe information is present (YES at step S402), cooking recipe information 600 related to the identification information is extracted (step S403).

On the other hand, when the cooking recipe information is not present (NO at step S402), cooking recipe information 600 is extracted based on the type information (step S404). For example, cooking recipe information 600 related to a cooking appliance whose type is the same as the cooking appliance owned by the user is extracted.

Cooking recipe information 600 extracted at step S403 and step S404 is supplied to information terminal 200 via communication part 130 of server 100, and is displayed on display part 230. At this time, the extracted cooking recipe is displayed above the other cooking recipe information on display part 230. As a result, necessary cooking recipe information can be made to be recognized by the user.

In another display method, the extracted cooking recipe information may be displayed so as to be larger than the other cooking recipe information or easily selected by the user. Further, cooking recipe information having the same identification information as that of the cooking appliance owned by the user and cooking recipe information of a cooking appliance of the same type that is not owned by the user may be displayed so as to be capable of being discriminated. Concretely, the discrimination is made by changing character sizes, changing colors, separating display positions, and changing icons. That is to say, any display content and display method may be used as long as the user can discriminate display.

A case where identification information for identifying a cooking appliance owned by the user is "A-02" will be described concretely as an example by using cooking recipe information 600 in cooking recipe information database 120 shown in FIG. 10.

When a search is conducted by using title information "P001" as a keyword, for example, cooking recipe ID information "X001", "X002", and "X004" is retrieved at step S303 in FIG. 3. Identification information related to cooking recipe ID information "X004" is cooking recipe information 600 related to "A-02" (corresponding to YES at step S402). Therefore, database search part 140 extracts cooking recipe ID information "X004" as cooking recipe information to be supplied to the user (corresponding to step S403).

Further, when a search is conducted by using title information "P007" as a keyword, cooking recipe ID information "X007" and "X009" is retrieved at step S303 in FIG. 3. In this case, the cooking recipe ID information "X007" and "X009" does not have cooking recipe information 600 whose identification information is related to "A-02" (NO at step S402). Therefore, database search part 140 extracts the cooking recipe ID information "X009" connected to type information "A" as cooking recipe information to be supplied to the user based on type information "A" (corresponding to step S404).

That is to say, the above method enables cooking recipe information 600 of the same types of cooking appliances to be supplied preferentially. As a result, the user can view a cooking recipe close to a cooking method of the cooking appliance owned by the user. As a result, the user has a great chance of cooking with reference to the viewed cooking recipe.

The above has described the extracting method in a case of complete matching with title information, but the present invention is not limited to this. As another example, the search may be conducted at step S303 in FIG. 3 by partial match with title information. For example, when the search is conducted for a character string including "hamburg", cooking recipe information of various title information such as "cheese hamburg", "hamburg with grated radish", "hamburg steak", and the like is searched as cooking recipe information 600 with the same title.

In this case, a cooking recipe extracting process shown in FIG. 4 is executed on searched cooking recipe information 600 at three times for each piece of cooking recipe information 600 with the same title ("cheese hamburg", "hamburg with grated radish" and "hamburg steak"). As a result, cooking recipe information 600 that should be referred to by the user can be extracted from plural pieces of cooking recipe information 600 with the same title.

However, when cooking recipe information 600 with the same title and the same type information is simultaneously supplied, it is difficult for the user to determine which cooking recipe information should be referred to. For this reason, it is desirable that one cooking recipe to be supplied is selected and is supplied to the user.

On the other hand, in a case of cooking recipe information 600 with the same title and different type information, cooking recipe information 600 is supplied so that the difference in type information is clearly presented. As a result, cooking recipes can be supplied to the user without confusing the user. For example, when the title information in cooking recipe information 600 includes two cooking recipes related to the type information "A" and two cooking recipes related to the type information "B", one recipe may be selected from the type information "A" and one recipe may be selected from type information "B" so that the selected recipes are supplied. As a result, options of cooking recipes to be supplied to the user can be increased. As a result, cooking recipe information that is easily referred to can be supplied to the user without deteriorating convenience.

In the above manner, a cooking recipe to be supplied to the user is extracted at step S304.

The process at step S305 and thereafter in FIG. 3 will be described below.

The information extracted as the cooking recipe to be supplied is transmitted as a searched result to information terminal 200 via communication part 130 of server 100 (step S305).

When communication part 210 receives the searched result, control arithmetic part 260 generates display screen data where title information is displayed as a list. The generated display screen data is displayed as list screen 231 on display part 230 (step S306). At this time, the user checks the searched results displayed in a form of the list on display part 230. The user selects and specifies one piece of desired title information (a cooking recipe or the like) using operation part 240 of information terminal 200 (step S307).

Information terminal 200 transmits cooking recipe ID information related to the title information specified by the user to server 100 via communication part 210 (step S308). As a result, server 100 receives the cooking recipe ID information via communication part 130.

Database search part 140 reads specific cooking recipe information 600 related to the received cooking recipe ID information from cooking recipe information database 120. Database search part 140, then, transmits the read information to information terminal 200 via communication part 130 (step S309). As a result, information terminal 200 receives specific cooking recipe information 600 via communication part 210.

Control arithmetic part 260 generates display screen data from cooking procedure information included in received specific cooking recipe information 600. Control arithmetic part 260, then, displays a cooking recipe using the generated display screen data as cooking method screen 232 (see FIG. 7) (step S310).

The user, then, selects control setting mark 280 of cooking method screen 232 displayed on display part 230 (see FIG. 7) (step S311). As a result, control information in cooking recipe information 600 specified at step S307 is transmitted from wireless part 250 of information terminal 200 to wireless part 310 of cooking appliance 300 (step S312). The transmitted control information is stored in control information storage part 320 of cooking appliance 300. At this time, for example, control information transmission completion screen 233 is displayed on display part 230 of information terminal 200 (see FIG. 8).

Controller 330 of cooking appliance 300 controls the operation part so that the operation is controlled based on the control information stored in control information storage part 320 (step S313). As a result, cooking is done according to specified cooking recipe information 600.

Communication system 1000 in the exemplary embodiment is operated in the above manner.

A screen to be displayed on display part 230 of information terminal 200 will be concretely described below with reference to FIG. 3, FIG. 4, and FIG. 5 to FIG. 8.

A screen where a keyword is input at step S301 in FIG. 3 will be described with reference to FIG. 5.

Figure 5:
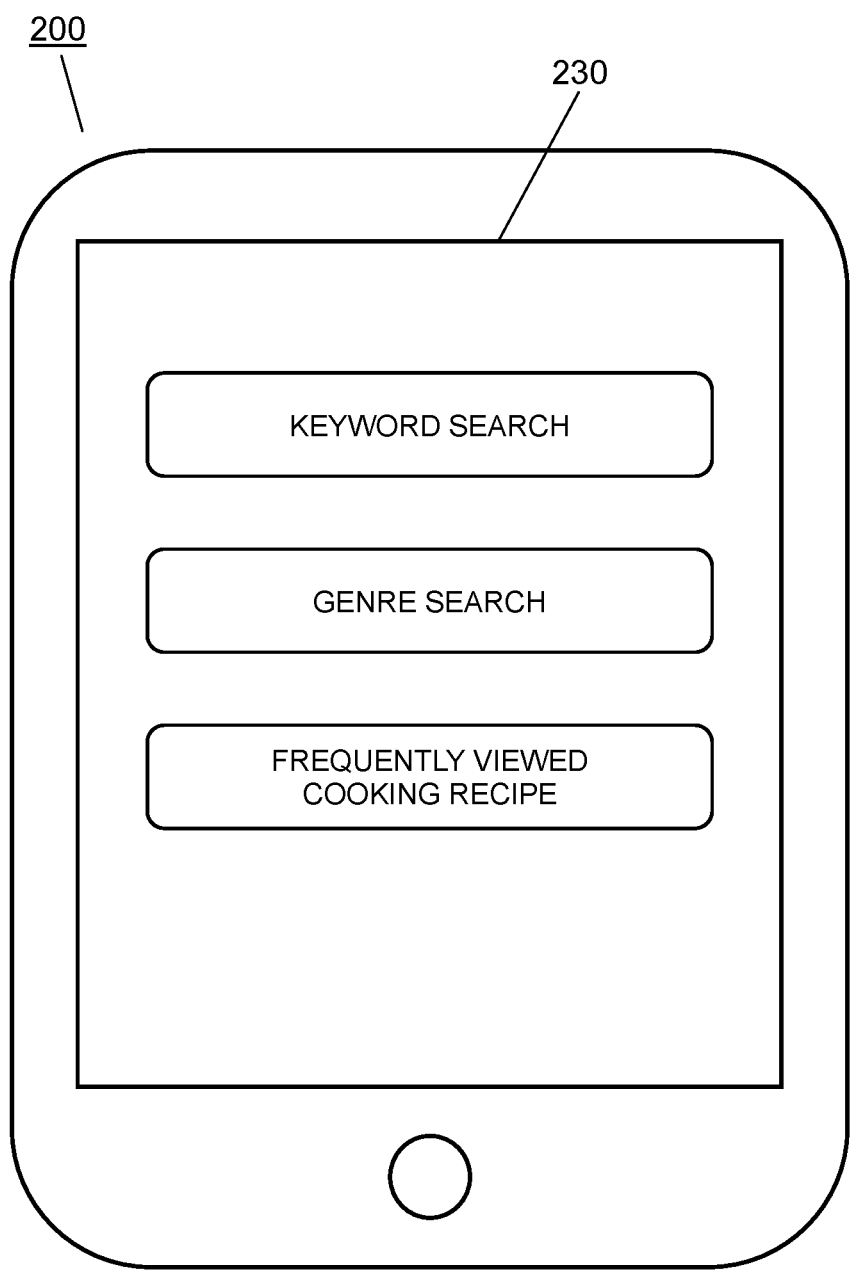
FIG. 5 is a diagram illustrating a display screen where a user selects a method for searching a cooking recipe to be displayed on a display part of the information terminal in the exemplary embodiment.

FIG. 5 is a diagram illustrating a display screen where a user selects a method for searching a cooking recipe to be displayed on the display part of the information terminal in the exemplary embodiment.

When inputting a keyword, the user selects an input method based on a display screen shown in FIG. 5.

A case where the keyword search is selected to conduct the search is described as an example in the exemplary embodiment, but the present invention is not limited to this. For example, a cooking recipe may be searched by using "genre search", "frequently viewed cooking recipe" or the like shown in FIG. 5. The "genre search" is a method for selecting classification desired by the user from target cooking classifications (for example, vegetable, meat and fish) and searching for a cooking recipe. Further, the "frequently viewed cooking recipe" is a method for displaying cooing recipes selected by the user for a predetermined period, for example, a past one month in a form of a list so as to allow the user to select a cooking recipe.

When the user presses down the "keyword search" on the display screen in FIG. 5, a field where a keyword is input is displayed on display part 230. The user inputs a keyword relating to a cooking recipe to be searched into the input field.

The display screen to be displayed at step S305 in FIG. 3 will be described below with reference to FIG. 6.

Figure 6:
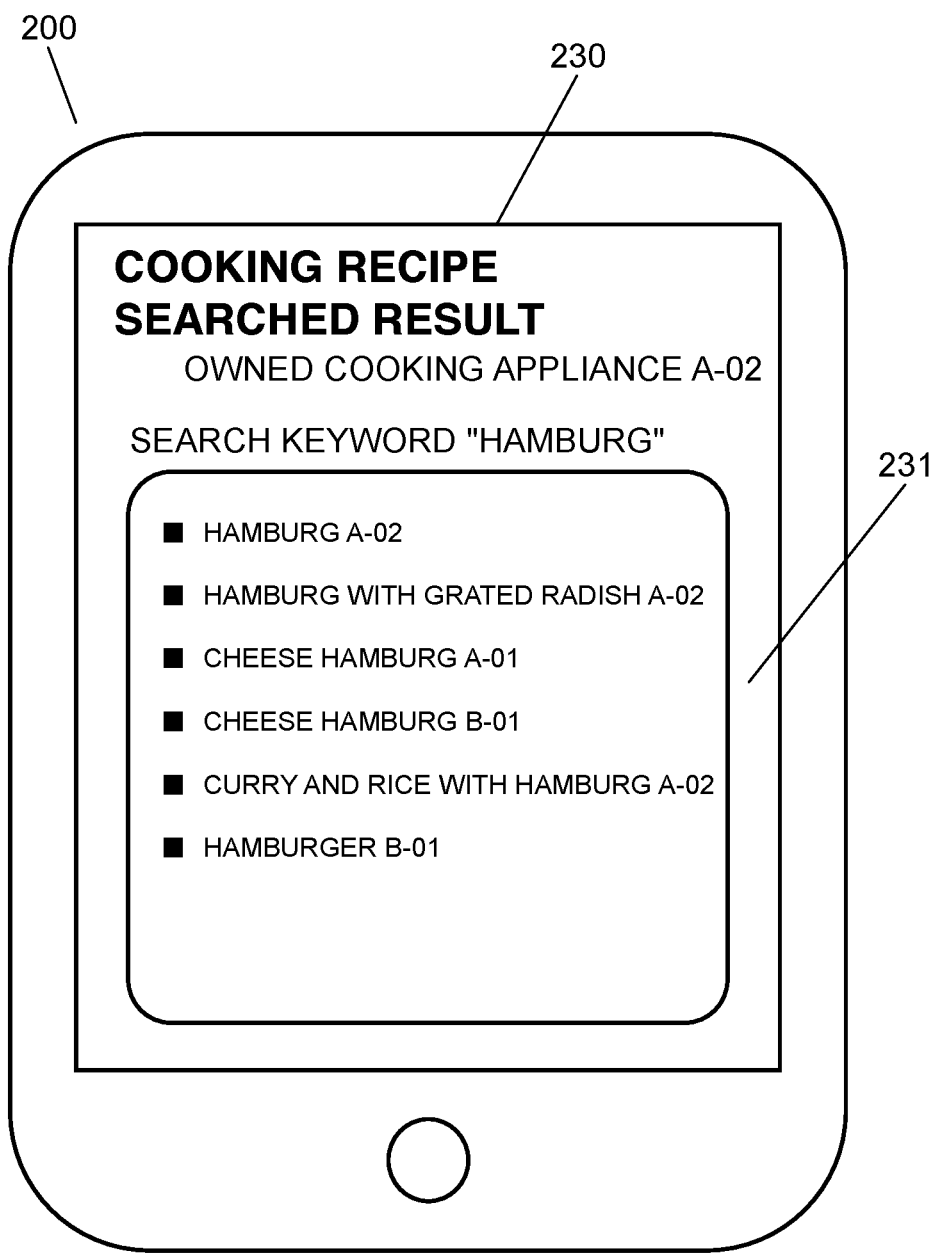
FIG. 6 is a diagram illustrating one example of a list screen generated by a control arithmetic part that receives searched results after the user inputs a keyword in the exemplary embodiment.

FIG. 6 is a diagram illustrating one example of a list screen generated by the control arithmetic part that receives searched results after the user inputs a keyword in the exemplary embodiment of the present invention.

In FIG. 6, cooking recipes that are searched results are displayed as list screen 231 on display part 230 based on the cooking recipe extracting method at step S303 and step S304 in FIG. 3.

That is to say, the cooking recipe information extracted from options selected by the user is displayed on display part 230 based on the identification information and the type information in the cooking recipe information database. As a result, the user can easily view the cooking recipe information that can be referred to.

The display screen displayed at step S310 in FIG. 3 will be described below with reference to FIG. 7.

Figure 7:
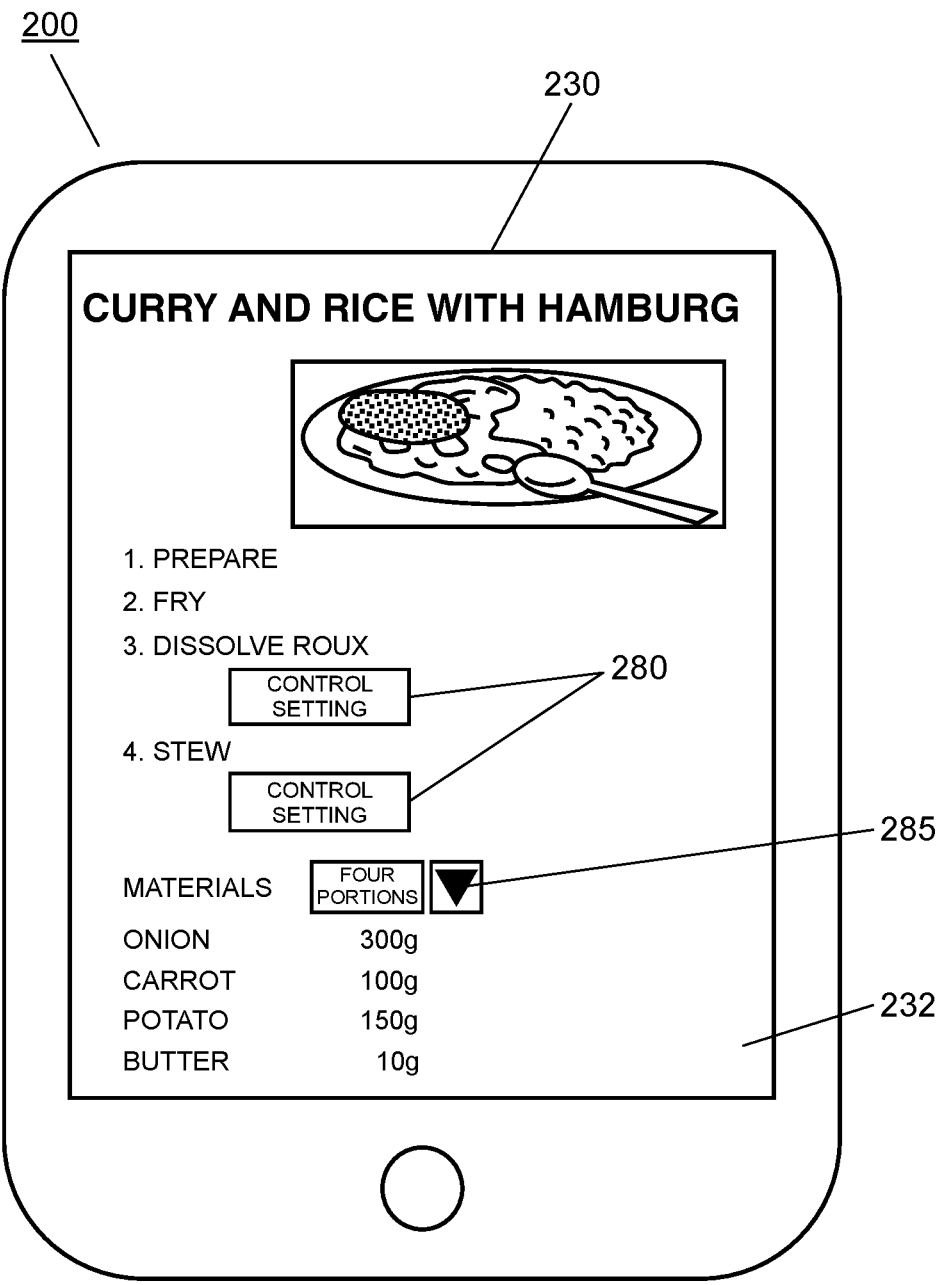
FIG. 7 is a diagram illustrating one example of a cooking method screen that indicates a cooking method when the user selects a cooking recipe in the exemplary embodiment.

FIG. 7 is a diagram illustrating one example of a cooking method screen that indicates a cooking method when the user selects a cooking recipe in the exemplary embodiment.

Cooking method screen 232 in FIG. 7 shows a screen where the control information shown on list screen 231 in FIG. 6 transits when operation part 240 selects "curry and rice with hamburg" as a menu.

Cooking method screen 232 in FIG. 7 shows a cooking method of "curry and rice with hamburg" generated from the cooking procedure information by control arithmetic part 260 of information terminal 200. Concretely, the procedure is such that (1) prepare food materials, (2) fry food materials, (3) put curry roux and water into a pot and heat them with cooking appliance 300 and allow the curry roux to dissolve, and (4) put the food materials into the pot with the dissolved curry roux and heat them with cooking appliance 300. That is to say, display part 230 displays a cooking method relating to selected specific cooking recipe information in a specific cooking recipe information group displayed on list screen 231 in FIG. 6 on cooking method screen 232.

In this case, (3) and (4) in the cooking procedure displayed on cooking method screen 232 need a heating operation using cooking appliance 300. For this reason, optimum setting information according to a cooking recipe should be transmitted to cooking appliance 300.

Therefore, control setting mark 280 for urging the user to transmit the control information is displayed below the cooking procedures (3) and (4) on cooking method screen 232 shown in FIG. 7.

That is to say, display part 230 of information terminal 200 displays the cooking method on cooking method screen 232 in order of time passage. Further, display part 230 displays a button such as control setting mark 280 that represents that the control information is transmitted to cooking appliance 300 via wireless part 250 on a position that needs the control information along a time series of the cooking procedure. As a result, the user can be guided along the time series of the cooking procedure. As a result, user's usability is further improved.

Further, portion number change setting mark 285 is displayed below the cooking procedure (4) on cooking method screen 232 of display part 230. As a result, the user presses down portion number change setting mark 285 so as to be capable of changing a number of portions. When the number of portions is changed, the cooking method and the control information are switched into ones according to the selected number of portions so as to be displayed on cooking method screen 232 of display part 230. As a result, the user's usability can be further improved.

The display screen to be displayed at step S312 in FIG. 3 will be described below with reference to FIG. 8.

Figure 8:
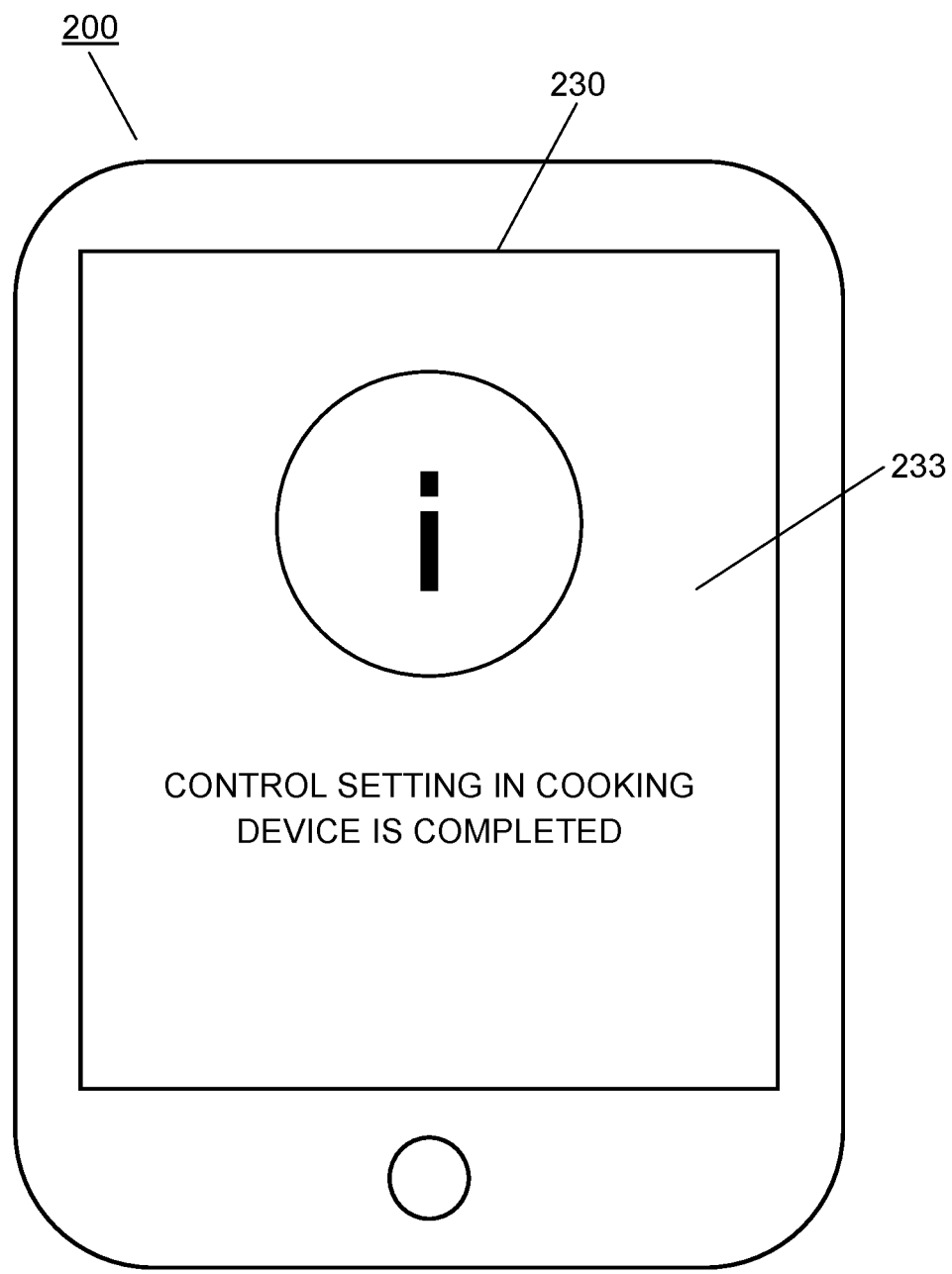
FIG. 8 is a diagram illustrating one example of a control information transmission completion screen to be displayed when control information is transmitted from the information terminal to the cooking appliance in the exemplary embodiment.

FIG. 8 is a diagram illustrating one example of a control information transmission completion screen to be displayed when control information is transmitted from the information terminal to the cooking appliance in the exemplary embodiment.

That is to say, the user presses down control setting mark 280 of the cooking procedure (3) or the cooking procedure (4) on cooking method screen 232 shown in FIG. 7, so as to transmit control information to cooking appliance 300. At this time, control information transmission completion screen 233 that indicates the transmission of the control information to the user shown in FIG. 8 is displayed on display part 230. Control information transmission completion screen 233 corresponds to display when the transmission of the control information at step S312 in FIG. 3 is completed. As a result, the user does not have to manually do complicated cooking setting. As a result, the user can easily set optimum control information in cooking appliance 300.

Server 100 receives a cooking recipe request signal via communication part 130 at step S308 in FIG. 3. Control information related to a cooking recipe specified as detailed data of the cooking recipe is read from cooking recipe information database 120. Further, the operation for transmitting the read information to information terminal 200 via communication part 130 at step S309 is described as an example, but the present invention is not limited to this. For example, only detailed data of the cooking recipe may be transmitted at step S309 in FIG. 3, and control information relating to the cooking recipe may be separately transmitted from server 100 to information terminal 200. As a result, for example, only when the user checks the detailed data of the cooking recipe and determines actual cooking, the user acquires the control information from server 100. As a result, a communication amount can be reduced.

Another configuration of the communication system in the exemplary embodiment will be described below with reference to FIG. 9, FIG. 11, and FIG. 12.

Figure 9:
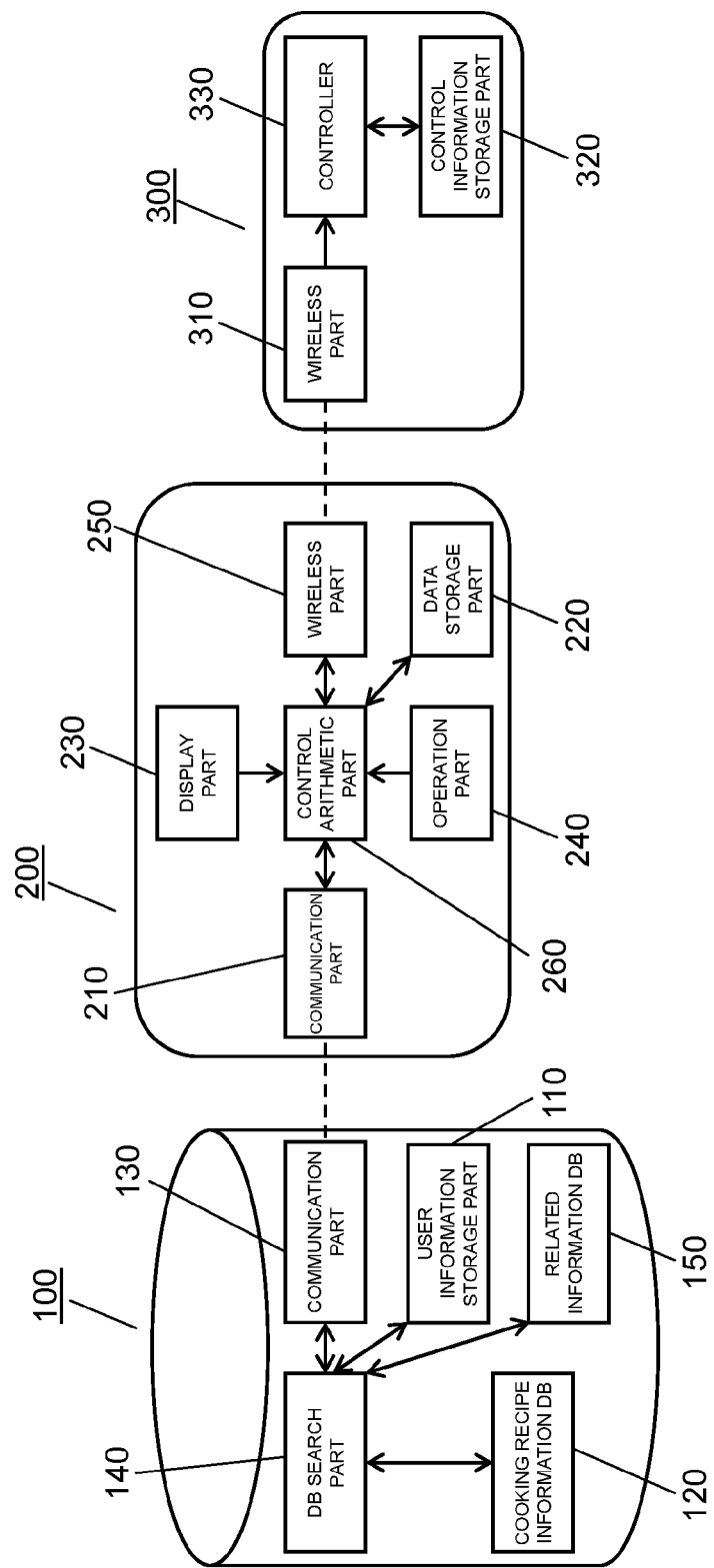
FIG. 9 is a block diagram illustrating a configuration of the server, the information terminal and the cooking appliance in another example of the exemplary embodiment.

FIG. 9 is a diagram illustrating another entire configuration of a communication system according to an exemplary embodiment. FIG. 11 is a diagram illustrating another example of information stored in the cooking recipe information database in the exemplary embodiment. FIG. 12 is a diagram illustrating one example of related information stored in a related information database in the exemplary embodiment.

As shown in FIG. 9, the communication system in another example is different from the communication system in FIG. 2 in that server 100 further includes a related information database. Since the other parts of the configuration are similar to those in the communication system in FIG. 2, description thereof is omitted.

That is to say, the example where cooking recipe information database 120 in server 100 stores cooking recipe information 600 including type information shown in FIG. 10 in the communication system of FIG. 2 is described.

However, the communication system in FIG. 9 has new related information database 150, and cooking recipe information database 120 in server 100 stores cooking recipe information 610 that does not include type information shown in FIG. 11.

Related information database 150 saves, as shown in FIG. 12, identification information, type information, cooking function information, and release time information as related information 700. The identification information and the type information correspond one-to-one with each other, and the type information related to the identification information is saved as related information 700 (corresponding to a first acquiring step).

That is to say, according to another example of the communication system shown in FIG. 9, when identification information and type information are acquired at step S401 in FIG. 4, the identification information is acquired from cooking recipe information database 120. The type information related to the identification information is acquired as type information related to identification information from related information database 150 that is newly provided.

As a result, saving of type information in user information storage part 110 and cooking recipe information 610 can be omitted. As a result, a memory for saving data can be saved, or an information amount for communication of cooking recipe information can be reduced.

In another example of the communication system, the configuration where server 100 includes related information database 150 is described as an example, but the present invention is not limited to this. For example, related information database 150 may be temporarily held by information terminal 200 or may be temporarily held by cooking appliance 300. As a result, since type information can be acquired from identification information, a similar effect can be provided.

Further, cooking recipe information 610 shown in FIG. 11 further includes cooking function information that is used for coking by means of a cooking appliance.

The cooking function information is a function provided to the cooking appliance. Concretely, a microwave oven is provided with plural pieces of cooking function information, such as "microwave function", "oven function", "steam function" and "grill function". For this reason, functions of cooking appliances vary according to types of the cooking appliances (identification information).

On the other hand, cooking recipes that are developed for cooking appliances are developed so as to do cooking through the functions of the cooking appliances. For this reason, in a case of "shaomai" for example, a cooking recipe for heating shaomai using the "microwave function" of the cooking appliance, and a cooking recipe for steaming shaomai using the "steam function" are provided. That is to say, the cooking function information enables the cooking with cooking recipes that reflect features of the cooking appliances.

As to the identification information and the cooking function information, one cooking appliance occasionally has a plurality of cooking functions. For this reason, the identification information and the cooking function information have a one-to-many (plural) relationship. Therefore, the cooking function information related to the identification information is held as related information 700 (corresponding to a third acquiring step).

As a result, when the cooking recipe information related to the identification information shown in FIG. 4 is not present (NO at step S402), the cooking recipe information can be supplied based on cooking function information of related information 700 at step S404 where the cooking recipe information is supplied based on the type information.

The operation in another example of the communication system shown in FIG. 9 will be concretely described below.

At step S303 in FIG. 3, contents of the cooking recipe information in cooking recipe information database 120 are contents of cooking recipe information 610 shown in FIG. 11, and contents in related information database 150 are contents of related information 700 shown in FIG. 12.

A case where the identification information of the cooking appliance owned by the user is "B-01" will be described concretely as an example.

For example, when a search is conducted by using title information "P009" as a keyword in cooking recipe information database 120, two pieces of cooking recipe ID information "X009" and "X010" are extracted. However, cooking recipe information 610 that matches with identification information "B-01" is not present. Therefore, extraction is performed based on the type information, but cooking recipe information 610 that matches with type information "B" is not present.

At this time, an attention is paid to that the cooking function information related to the identification information "B-01" is "G". Cooking recipe ID information "X010" related to the cooking function information saved in cooking recipe information 610 that matches with the cooking function information "G" is extracted.

As a result, the cooking recipe information that matches with the cooking function information can be extracted. For this reason, when cooking recipe information related to the identification information and type information is not present, the cooking recipe information can be supplied based on the cooking function information. As a result, cooking recipe information that is referred to more easily can be supplied to the cooking appliance owned by the user.

The above has described the example where the cooking function information is saved in cooking recipe information 610 shown in FIG. 11, the present invention is not limited to this. For example, even when the cooking function information is not saved like cooking recipe information 600 shown in FIG. 10, cooking function information related to a cooking recipe can be estimated in related information database 150 based on the identification information.

A method for estimating the cooking function information related to the cooking recipe will be concretely described below by using related information 700 in related information database 150 in FIG. 12 as an example.

For example, when a cooking recipe of type information "A" is supplied to a user having identification information "B-01" shown in FIG. 12, a cooking recipe of identification information "A-02" whose cooking function information "G" is the same as that of the identification information "B-01" is preferentially supplied. As a result, cooking recipe information that is likely to be easily referred to can be supplied.

Related information database 150 stores related information 700 including the release time information related to the identification information as one example. The release time information is information about a timing when a cooking appliance is released. Concretely, this is information for comparing release timings of a plurality of cooking appliances such as a date, month and date, or year. At this time, as shown in FIG. 12, the identification information and the release time information have a one-to-one relationship. Therefore, the release time information related to the identification information is held as related information 700 (corresponding to a fourth acquiring step).

With this configuration, when the cooking recipe information related to the identification information is not present (NO at step S402), cooking recipe information can be supplied based on release time information of related information 700 at step S404 where cooking recipe information is supplied based on the type information.

The operation for supplying the cooking recipe information based on the release time information of related information 700 will be concretely described below.

Contents in cooking recipe information database 120 are contents of cooking recipe information 610 shown in FIG. 11, and contents in related information database 150 are contents of related information 700 shown in FIG. 12.

A case where the identification information of the cooking appliance owned by the user is "A-02a" will be concretely described as an example.

For example, when a search is conducted by using title information "P009" as a keyword in cooking recipe information database 120, two pieces of cooking recipe ID information "X009" and "X010" are extracted. However, in FIG. 11, cooking recipe information 610 that matches with the identification information "A-02a" is not present. Therefore, extraction is performed based on the type information based on the related information 700 in FIG. 12, but the type information is also type information "A".

At this time, as shown in FIG. 12, the release time information related to the identification information "A-02a" is "June 2014". Therefore, identification information "A-02" that is "May 2014" and is close to the identification information "A-02a" is extracted as release time information saved in related information database 150.

That is to say, the cooking recipe information is extracted based on the release time information. As a result, the cooking recipe information of the cooking appliance whose release time is near can be extracted for the cooking appliance owned by the user. As a result, the cooking recipe information that is likely to be applied to the cooking recipe of the cooking appliance owned by the user can be supplied.

The example that the cooking recipe information whose release time is near is supplied has been described as an example, but the present invention is not limited to this. For example, cooking recipe information of a cooking appliance whose release time is the latest may be supplied. As a result, the cooking recipe information developed by a latest cooking appliance can be supplied preferentially to the user. As a result, the user can do cooking with reference to cooking recipe information that reflects trendy food materials and seasoning. Further, from a sales viewpoint of a cooking appliance, cooking recipe information of a latest cooking appliance is supplied preferentially to the user, so that an attention can be called to the function of the latest cooking appliance and a sales promotion can be efficiently done.

The operation of the communication system in another example shown in FIG. 9 is realized in the above manner.

A control program for supplying a cooking recipe via the communication system in the exemplary embodiment will be described below.

The control program for supplying a cooking recipe includes a step of acquiring identification information for identifying a cooking appliance owned by a user and type information representing a type of the cooking appliance owned by the user, and a step of acquiring plural pieces of cooking recipe information including cooking recipe information related to the identification information. At this time, when the acquired cooking recipe information includes cooking recipe information related to the identification information, the cooking recipe information related to the identification information is supplied. Further, when the acquired cooking recipe information does not include the cooking recipe information related to the identification information, a computer is made to execute a step of supplying the cooking recipe information based on the type information.

According to this control program, even when a plurality of the cooking recipes having the same title is present in the cooking recipes to be viewed by a user, the cooking recipe information of the cooking appliance owned by the user (namely, the cooking recipe information related to the identification information) can be supplied. Further, even when the cooking recipe information related to the identification information is not present, the cooking recipe information can be supplied based on the type information of the cooking appliance owned by the user. As a result, the user can easily view an optimum cooking recipe to be easily referred to. Further, the process for extracting a cooking recipe to be supplied can be changed by updating the control program according to a use condition of a service. As a result, versatility is further heightened and user's usability can be further improved.

The above-described concrete exemplary embodiment or the example clarifies the technical content of the present invention. For this reason, the present invention is not limited to the exemplary embodiment or the example nor interpreted in a narrow sense, and thus it goes without saying that various modifications can be made.

The cooking recipe supply method of the present invention includes a first acquiring step of acquiring identification information for identifying a cooking appliance and type information representing a type of the cooking appliance, and a second acquiring step of acquiring plural pieces of cooking recipe information including cooking recipe information related to the identification information. When the cooking recipe information includes the recipe information related to the identification information, the cooking recipe information related to the identification information is supplied. Further, the method may include a supply step of, when the cooking recipe information does not include the cooking recipe information related to the identification information, supplying the cooking recipe information based on the type information.

According to this supply method, even when the cooking recipe information viewed by a user includes a plurality of cooking recipes with the same title, cooking recipe information of a cooking appliance owned by the user (the cooking recipe information related to the identification information) can be supplied. Further, even when the cooking recipe information related to the identification information is not present, the cooking recipe information can be supplied based on the type information of the cooking appliance owned by the user. As a result, the user can easily view a suitable cooking recipe to be easily referred to according to the user's cooking appliance.

Further, in the cooking recipe supply method of the present invention, the type information is related to the identification information, and the type information related to the identification information for identifying the cooking appliance may be acquired at the first acquiring step. As a result, the type information is acquired from the identification information for identifying the cooking appliance owned by the user. As a result, when a cooking recipe is supplied, the identification information of the cooking appliance is acquired so that the type information can be acquired. For this reason, a memory for saving information can be saved, or an information amount for communication can be reduced. As a result, the cooking recipe supply method can be realized by a more simple and inexpensive configuration.

Further, in the cooking recipe supply method of the present invention, the identification information is related to the cooking function information of the cooking appliance. The method further includes the third acquiring step of acquiring cooking function information related to the identification information. At the supply step, when the cooking recipe information related to the identification information is not present, the cooking recipe information may be supplied based on the cooking function information.

As a result, when the cooking recipe information related to the identification information is not present, the cooking recipe information can be supplied based on the type information and cooking function information. For example, the cooking recipe information of the same type of the cooking appliance having the same cooking function can be supplied. As a result, the cooking recipe information that is easily referred to can be supplied to the cooking appliance owned by the user.

Further, in the cooking recipe supply method of the present invention, the identification information is related to the release time information of the cooking appliance. The method further includes the fourth acquiring step of acquiring the release time information related to the identification information. At the supply step, when the cooking recipe information related to the identification information is not present, the cooking recipe information may be supplied based on the release time information.

As a result, when the cooking recipe information related to the identification information is not present, the cooking recipe information can be supplied based on the type information and the release time information. For example, the cooking recipe information of the same type of cooking appliance whose release time is near can be supplied. As a result, the cooking recipe information that is easily referred to can be supplied to the cooking appliance owned by the user.

Further, the control program of the present invention includes the step of acquiring identification information for identifying a cooking appliance and type information representing a type of the cooking appliance, and the step of acquiring plural pieces of cooking recipe information including the cooking recipe information related to the identification information. When the cooking recipe information includes the cooking recipe information related to the identification information, the cooking recipe information related to the identification information is supplied. Further, when the cooking recipe information does not include the cooking recipe information related to the identification information, a computer may be made to execute the step of supplying the cooking recipe information based on the type information.

This control program can supply the cooking recipe information based on the type information of the cooking appliance owned by the user. As a result, the user can view an optimum cooking recipe to be easily referred to.

INDUSTRIAL APPLICABILITY

The present invention is useful as a cooking recipe supply method and a control program for an information terminal that receives cooking recipes supplied by a server or an information terminal that transmits a cooking program to a cooking appliance.

REFERENCE MARKS IN THE DRAWINGS

100: server
110: user information storage part
120: cooking recipe information database
130, 210: communication part
140: database search part
150: related information database
200: information terminal
220: data storage part
230: display part
231: list screen
232: cooking method screen
233: control information transmission completion screen
240: operation part
250, 310: wireless part
260: control arithmetic part
280: control setting mark
285: portion number change setting mark
300: cooking appliance
320: control information storage part
330: controller
400: base station
600, 610: cooking recipe information
700: related information
1000: communication system

The invention claimed is:

1. A cooking recipe supply method for supplying a suitable cooking recipe, from a server to an information terminal via a first communication network or from the information terminal to a cooking appliance via a second communication network, the method comprising:
  searching, by the server or the information terminal, one or more cooking recipes based on input information;
  acquiring, by the server or the information terminal, identification information for identifying the cooking appliance, type information representing a type of the cooking appliance, and function information related to the identification information;

determining, by the server or the information terminal, whether the one or more cooking recipes correspond to the identification information or the type information;

when it is determined that at least one recipe of the one or more cooking recipes corresponds to the identification information, supplying the at least one recipe corresponding to the identification information to the information terminal via the first communication network or to the cooking apparatus via the second communication network;

when it is determined that no recipe of the one or more cooking recipes corresponds to the identification information and at least one recipe of the one or more cooking recipes corresponds to the type information, supplying the at least one recipe corresponding to the type information to the information terminal via the first communication network or to the cooking apparatus via the second communication network; and when it is determined that no recipe of the one or more cooking recipes corresponds to the identification information and no recipe of the one or more cooking recipes corresponds to the type information, determining, by the server or the information terminal, whether the one or more cooking recipes correspond to the function information, and when it is determined that at least one recipe of the one or more cooking recipes corresponds to the function information, supplying the at least one recipe corresponding to the function information to the information terminal via the first communication network or to the cooking apparatus via the second communication network.

2. The cooking recipe supply method according to claim 1, wherein:

the type information is related to the identification information, and at the acquiring, the type information related to the identification information for identifying the cooking appliance is acquired.

3. The cooking recipe supply method according to claim 1, wherein:

the identification information is related to product release time information of the cooking appliance, the method further comprises acquiring the product release time information related to the identification information, and when it is determined that no recipe of the one or more cooking recipes corresponds to the function information, determining, by the server or the information terminal, whether the one or more cooking recipes correspond to the product release time information, and when it is determined that at least one recipe of the one or more cooking recipes corresponds to the product release time information, supplying the at least one recipe corresponding to the product release time information to the information terminal via the first communication network or to the cooking apparatus via the second communication network.

4. An apparatus for supplying a suitable cooking recipe to an information terminal via a first communication network or to a cooking appliance via a second communication network, the apparatus comprising a computer programmed to perform:

searching one or more cooking recipes based on input information;

acquiring identification information for identifying the cooking appliance, type information representing a type of the cooking appliance, and function information related to the identification information;

determining whether the one or more cooking recipes correspond to the identification information or the type information;

when it is determined that at least one recipe of the one or more cooking recipes corresponds to the identification information, supplying the at least one recipe corresponding to the identification information to the information terminal via the first communication network or to the cooking apparatus via the second communication network;

when it is determined that no recipe of the one or more cooking recipes corresponds to the identification information and at least one recipe of the one or more cooking recipes corresponds to the type information, supplying the at least one recipe corresponding to the type information to the information terminal via the first communication network or to the cooking apparatus via the second communication network; and when it is determined that no recipe of the one or more cooking recipes corresponds to the identification information and no recipe of the one or more cooking recipes corresponds to the type information, determining whether the one or more cooking recipes correspond to the function information, and when it is determined that at least one recipe of the one or more cooking recipes corresponds to the function information, supplying the at least one recipe corresponding to the function information to the information terminal via the first communication network or to the cooking apparatus via the second communication network.

\* \* \* \* \*